United States Patent [19]

Manton et al.

[11] Patent Number: 4,604,750
[45] Date of Patent: Aug. 5, 1986

[54] PIPELINE ERROR CORRECTION

[75] Inventors: John C. Manton, Marlboro; William F. Bruckert, Hudson; Alfred J. Dellicicchi, Acton, all of Mass.

[73] Assignee: Digital Equipment Corporation, Maynard, Mass.

[21] Appl. No.: 549,610

[22] Filed: Nov. 7, 1983

[51] Int. Cl.⁴ .................. G06F 11/10; G11C 29/00
[52] U.S. Cl. .................................. 371/38; 371/13
[58] Field of Search .................. 371/13, 38; 364/200, 364/900

[56] References Cited

U.S. PATENT DOCUMENTS

| | | | |
|---|---|---|---|
| 3,824,547 | 7/1974 | Green et al. | 371/32 |
| 4,058,851 | 11/1977 | Scheuneman | 371/38 X |
| 4,072,853 | 2/1978 | Barlow et al. | 371/51 |
| 4,112,502 | 9/1978 | Scheuneman | 371/38 X |
| 4,117,974 | 10/1978 | Ciaramella | 371/51 |
| 4,249,253 | 2/1981 | Gentili et al. | 371/38 |
| 4,355,393 | 10/1982 | Kubo et al. | 371/51 |
| 4,360,915 | 11/1982 | Sindelar | 371/13 |
| 4,360,917 | 11/1982 | Sindelar et al. | 371/49 |
| 4,369,510 | 1/1983 | Johnson et al. | 371/13 |
| 4,371,930 | 2/1983 | Kim | 364/200 |
| 4,388,684 | 6/1983 | Nibby, Jr. et al. | 371/38 X |

Primary Examiner—Charles E. Atkinson
Attorney, Agent, or Firm—Cesari and McKenna

[57] ABSTRACT

In a data processing system, a memory (32) consists of data words and associated error-correction codes that are independently accessible; it is possible simultaneously to read a data word and write its associated error-correction code. This allows a memory-control circuit (30) immediately to store in the memory (32) a data word sent by a processor (10) while it is concurrently in the process of generating the error-correction code for that data word. The result is that the memory-control circuit (30) can subsequently fetch the newly stored data word before storage of its associated error-correction code is complete. This reduces delays involved in error-correction-code generation. The data word includes not only non-redundant information but also parity bits that both the processor (10) and the memory-control circuit (30) employ to determine whether a data word is correct. If the memory-control circuitry (30) determines that a word that it has forwarded to the processor (10) is incorrect, it immediately fetches the corresponding error-correction code and corrects the location in memory. Then, when the processor (10) finds that the parity is incorrect in the data word, it repeats its request for the data word in question, which the memory-control circuit (30) has corrected in the memory (32).

6 Claims, 3 Drawing Figures

PIPELINE ERROR CORRECTION

BACKGROUND OF THE INVENTION

The present invention is directed to data processing systems and in particular to error-correction schemes used in such systems.

As the density of data storage has increased in data processing systems, the contents of the storage devices have been subject to more sources of errors. For example, the contents of storage cells in some dynamic memories can be changed even by alpha-particle bombardment. Although the probability that any particular cell will be thus changed within a moderate amount of time is still very small, modern data-processing systems employ arrays of such cells that are so large that the occurrence of data errors is unavoidable.

To deal with such problems, computer designers have resorted to arrangements employing error-correction codes. A typical error-correction code for a multi-bit data word consists of a number of "check bits" that are generated in accordance with a predetermined algorithm. Each possible multi-bit data word is associated with only a single one of the possible sequences of check bits. Therefore, out of all of the possible composite words consisting of the multi-bit data word plus the check bits, only a very small fraction are valid words; if there are N check bits, only one out of every $2^N$ possible composite words is valid. The error-correction-coding scheme is so arranged that each of the valid composite words is at a large "distance" in a coding-theory sense from every other valid composite word. Error *correction*, as opposed to *detection*, can be accomplished for the most-frequent types of errors because the composite word resulting from each of the probable errors is much "closer" to a single valid composite word than it is to any of the other valid composite words. These invalid words are "close" in the sense that they are much more likely to have resulted from errors in that one valid word than they are to have resulted from errors in any other valid word. Consequently, for those invalid words that are "close" to certain valid words, the error-correction circuitry infers that the word should have been the valid word to which the invalid word is closest. Thus, the data-processing system can correct, as well as detect, errors in the data. Of course, some errors are not correctable—in fact, some are not even detectable—but the errors that are most likely to occur can be corrected.

Modern data-processing systems have also been called upon to operate at higher speeds. Unfortunately, the requirement for error correction is not entirely consistent with that for speed. The correction algorithms that use error-correction codes to correct erroneous data can be quite time-consuming. Although use of the correction algorithms is necessary when a data error occurs, correction hardware, in the form, for example, of gates in the path from the system memory to the system processor, typically adds delays even in the absence of errors. Furthermore, an error-correction code must be calculated whenever a data word is stored in the system memory, and the required calculation time can delay retrieval of the associated data word.

It is accordingly an object of the present invention to provide error correction in a system that does not require the presence of the error-correction gates in the signal path from the memory to the instruction-execution portion of the system. It is another object of the present invention to reduce the delay caused by the error-correction process.

It is an object of another aspect of the invention to afford the benefits of an error-correction-coding scheme while eliminating the possible delay required by error-correction-code generation.

SUMMARY OF THE INVENTION

The foregoing and related objects are achieved in a data processing system that has a memory in which each data word and its associated error-correction code are separately accessible. A memory controller operates the memory to store and retrieve data, and it computes the error-correction code to be stored with each data word. A processor executing instructions communicates with the memory controller to request instructions and operands and to return results to the memory. When the processor sends information to the memory controller for storage in the memory, the memory controller immediately stores the data word in the memory before it has finished calculating the error-correction code. The data word written into memory includes parity bits, and the memory controller may immediately fetch the just-stored data word with parity bits but without the associated error-correction code. Fetching of the data word can occur simultaneously with storage of its associated error-correction code in the memory.

When the memory controller fetches a data word to send it to the processor, it checks the parity bits in the data word to determine if an error has occurred. However, before this determination has been completed, the memory controller forwards the data word, with its parity bits, to the processor. Thus, fetching of a data word for the processor is delayed neither by the initial calculation of the error-correction code before storage nor by the parity checking that occurs during fetching. If the memory controller does determine, based on a parity check, that the data word is in error, it fetches the error-correction code that corresponds to the data word, performs the correction if the error is correctable, and rewrites the corrected word into the memory.

In a pipeline machine, the processor may never actually use the incorrect data word forwarded to it. But, if the processor does need to use the data word, it responds to the incorrect parity in the data word by stopping execution of the instruction involving that data word and requesting that the data word be retransmitted from the memory. Typically, the memory controller will have corrected the memory location containing that data word by the time at which the request from the central processor unit is repeated, so recovery from an error is expedited.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

As was discussed above, the present invention is directed to error detection and correction in the memory, memory controller, and central processing unit of the data processing system. These features will be discussed with particularity in connection with FIGS. 2 and 3. Before proceeding to a discussion of those drawings, however, we will first describe in connection with FIG. 1 a typical system that might employ the teachings of the present invention.

Figure 1:
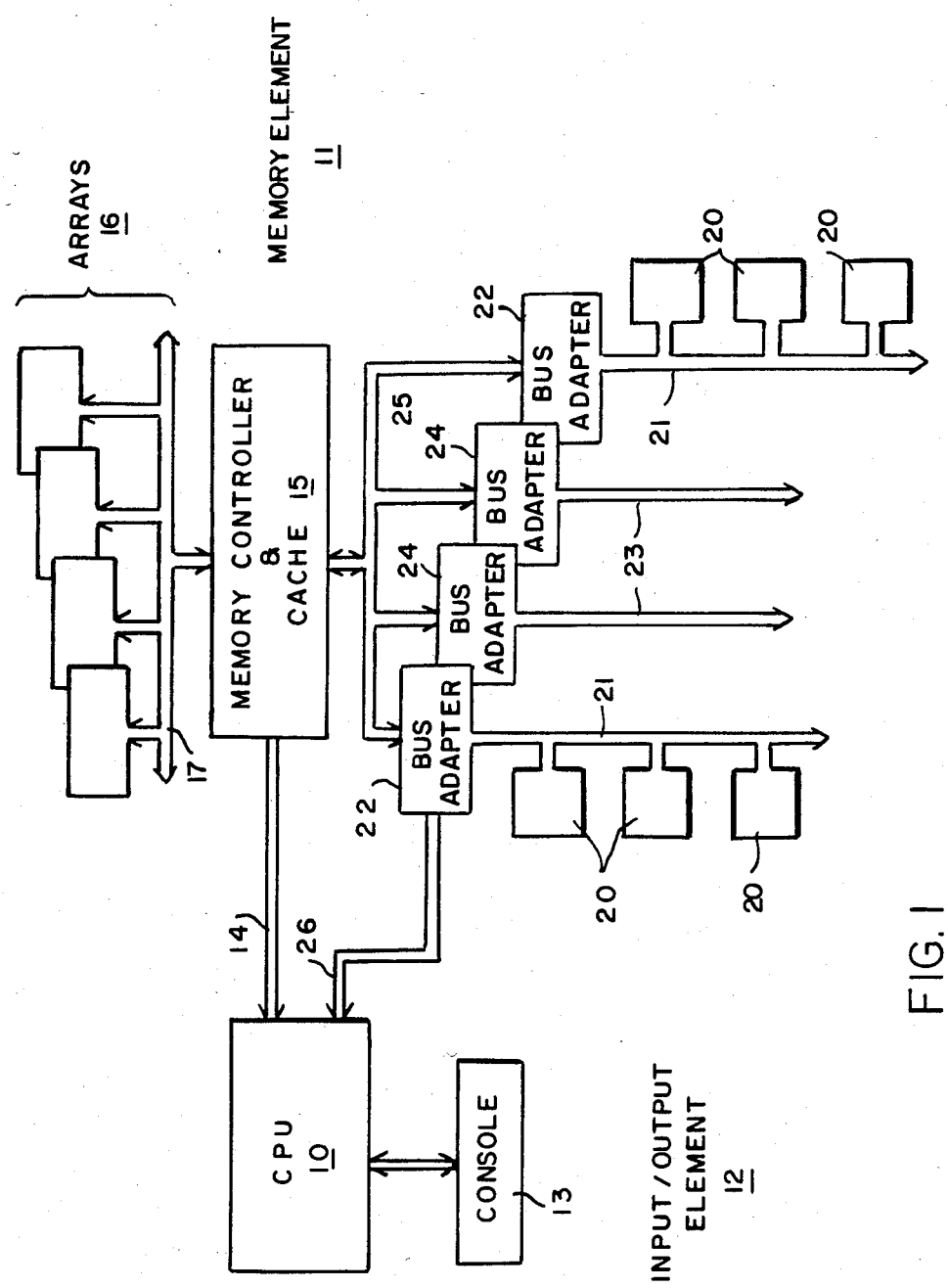
FIG. 1 is a block diagram giving an overview of a typical data-processing system in which the teachings of the present invention can be employed.

As exemplified in FIG. 1, the basic elements of a data processing system including the invention comprise a central processor unit (processor) 10, a memory unit 11, and an input/output element 12. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned to the memory unit. The processor 10 also transmits control information to units in the input/output element 12, enabling them to perform selected operations, such as transmitting data to or retrieving data from the memory unit 11. Such data may be instructions, operands transmitted to the memory unit, or processed data retrieved from the memory for storage or display.

An operator's console 13 serves as the operator's interface. It allows the operator to examine and deposit data, halt the operation of the central processor unit 10, or step the central processor unit through a sequence of instructions and determine the processor's responses. It also enables an operator to initialize the system through a bootstrap procedure and perform various diagnostic tests on the entire data processing system.

The central processor unit 10 is connected to the memory unit 11 through several buses generally identified by the reference numeral 14. Specifically, the central processor unit 10 is directly connected to a memory controller and cache 15, which, in turn, connects to a plurality of arrays 16 over an array bus 17.

The data processing system may include several types of input/output units, including disk and tape secondary storage elements, teletypewriters, keyboards and video display terminals, and the like. These units 20 are connected through an input/output bus 21 to a bus adapter 22. The input/output bus 21 may be as described in U.S. Pat. No. 4,232,366 for a "Bus For Data Processing System With Overlap Sequences," which was issued in the name of John V. Levy et al. and assigned to the assignee of the present invention. Other types of input/output buses may also be used to connect to similar input/output units (not shown), including an input/output bus 23, connected to a bus adapter 24, which may be as described in U.S. Pat. No. 3,815,099, which issued on June 4, 1974, in the name of J. Cohen et al. and is entitled "Data Processing System."

The bus adapters 22 and 24 are connected to transmit and receive data from memory controller and cache 15 over an adapter bus 25. The bus adapters are also connected by an interrupt request/grant bus 26, over which the bus adapters can interrupt the processing of central processor unit if an input/output unit 20 changes its status. The central processing unit 10 responds by transferring interrupt-request grant signals directly to units in the input/output element, but it transmits control information to, and receives status information from the units in the input/output element 12 through memory controller and cache 15. The memory controller thus controls the transfer of data to and from the central processing unit 10 and the input/output element 12. It also controls the transfer of control and status information between the central processing unit and input/output element 12.

Figure 2:
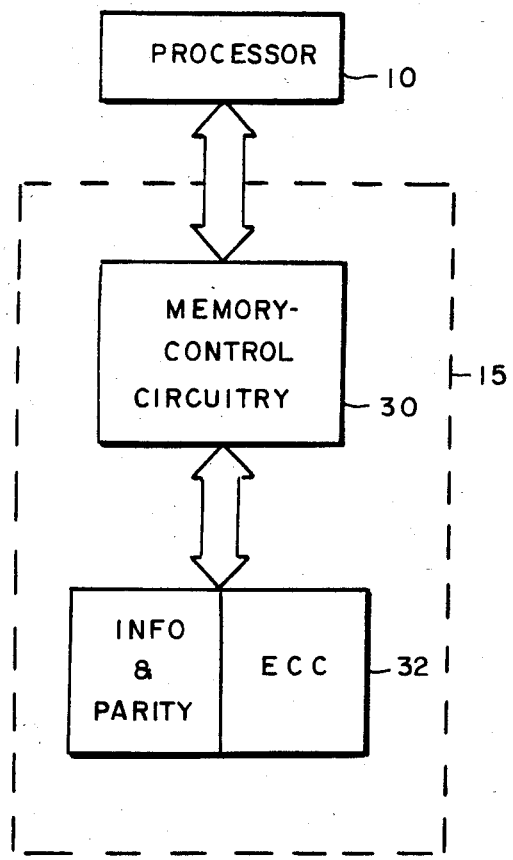
FIG. 2 is a block diagram showing in slightly more detail those elements of the system of FIG. 1 that are most involved in carrying out the teachings of the present invention.

The memory controller and cache 15 includes memory-control circuitry 30 and a cache memory 32, as is indicated in FIG. 2. The cache memory is a small, very fast memory whose locations at any given time correspond to certain locations in the memory arrays 16. As those skilled in the art will recognize, the correspondence between the cache locations and the array locations continually changes during execution of a program in such a manner that most of the requests by the processor 10 for data will specify a memory location that is in the cache memory, even though the cache memory corresponds to only a small fraction of the locations in the memory arrays 16. Thus, the data-processing system can take advantage of the high speed available in a fast but expensive type of memory without the need to employ the expensive memory type for the whole array.

We now turn to a discussion of the features of the present invention. As the discussion proceeds, it will be evident that the basic features can be employed not only in transferring data to and from a cache memory but also in transferring data to and from other devices, such as the memory arrays 16 or the I/O devices 20. For simplicity, however, and because most data exchanges typically occur between the central processor unit 10 and the cache memory 32, the invention will only be described in connection with such transfers.

In accordance with the present invention, the cache 32 (which we will refer to hereafter simply as the "memory" 32 because there is no requirement that the present invention be carried out in connection with a cache memory) stores both data words and error-correction codes associated with the data words. Despite the presence of the error-correction codes, the data words contain parity (i.e., error-detection rather than error-correction) bits in addition to non-redundant information. For instance, the memory 32 may be organized into data words having thirty-two bits of non-redundant information, four parity bits (one parity bit for each eight-bit byte), and an error-correction code consisting of six check bits. (Since the cache memory is associative, there are also "tag" bits that indicate the correspondence between the locations in the cache memory 32 and those in the memory arrays 16, but a discussion of these bits is not necessary for present purposes.) The error-correction code and the data word are separately accessible; that is, a data word can be read or written without reading or writing its associated error-correction code. Furthermore, the memory-control circuitry 30 can fetch a data word from the memory 32 while it is simultaneously writing the corresponding error-correction code into it. This feature, together with the provision of parity bits that are stored and fetched as part of the data word, provide the operational advantages that will now be described in connection with FIGS. 2 and 3.

In a typical data processing system in which the present invention is employed, the processor 10 operates in a pipeline manner. That is, while it is executing a given instruction, it simultaneously operates the memory-control circuitry 30 to fetch the next instruction in the memory and assemble any operands designated by that instruction. Of course, the next instruction in the memory is not always the next instruction to be executed, and it is not always possible to know the location of a subsequent instruction until the current instruction has been executed. In such cases, the processor 10 must drop the instruction that it has "pre-fetched" and await the retrieval of the instruction designated by the latest execution. However, the next instruction in the memory is often enough the next instruction to be executed that pre-fetching greatly speeds the operation of the data processing system.

Figure 3:
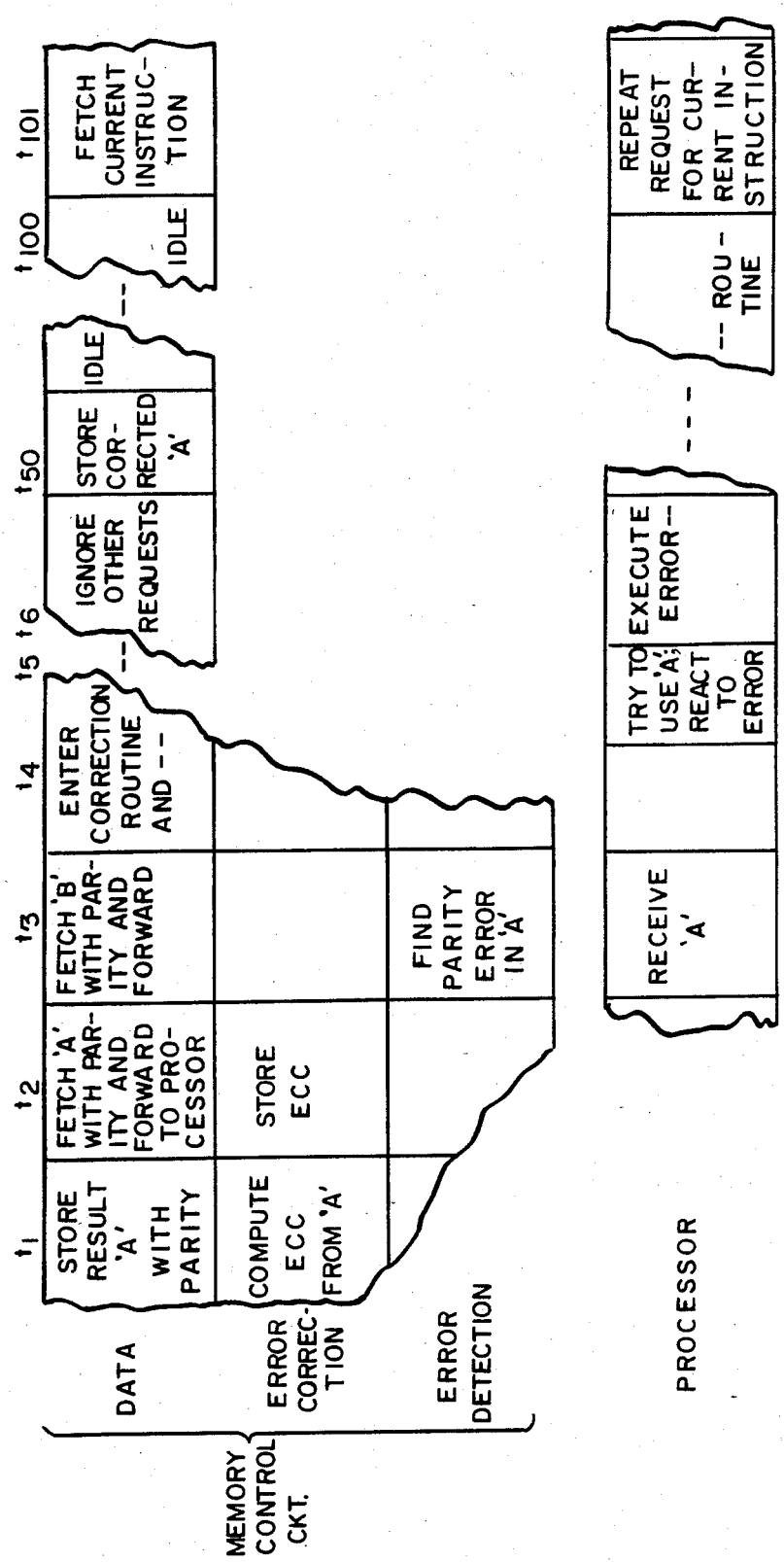
FIG. 3 is a timing diagram illustrating the operation of a data processing system that employs the teachings of the present invention.

For the sake of simplicity, FIG. 3 depicts only a portion of the operation of the system, in which one specific instruction ends and another begins. Specifically, it is assumed for the sake of illustration that execution of the first instruction ends with storage of its result "A" and that the subsequent instruction requires that result and another data word as its operands. It is also assumed that there is an error in the retrieval of the first operand but that the error is correctable. Finally, it is assumed that the instructions involved are not of the type that render an error unrecoverable—e.g., of the type in which there is the potential for modification of the memory location in question between correction and re-reading of that location. Clearly, not all of these assumptions are valid in all instances in which the present invention is practical, and operation of the error-correction scheme will vary in some respects from the following example during other operations. However, the basic principles of the invention described below will remain the same.

FIG. 3 depicts the timing of a typical operation of the elements of FIG. 2. The first three rows represent the data-transfer, error-correction, and error-detection functions of the memory-control circuitry 30, which functions can be performed simultaneously. The fourth row represents some functions of the processor 10. At the point in the operation when FIG. 3 starts, the processor 10 has completed execution of an instruction by requesting that the memory-control circuitry 32 store a result "A," along with its parity bits, in the memory 32.

In the illustrated system, the processor generates parity bits along with its results, so the memory-control circuitry immediately stores in the memory 32 a data word that includes both non-redundant information and parity. This operation is depicted in the first row of FIG. 3 at $t_1$. Simultaneously, the memory-control circuitry 30 computes the error-correction code corresponding to "A," as the second row indicates. In other words, the result "A" is stored in the memory 32 before the error-correction code corresponding to it is ready.

This is an important result in a pipeline machine because, as was explained above, the processor 10 typically will already have fetched its next instruction and will be ready to fetch an operand designated by that instruction. In a significant number of cases, the operand requested for the next instruction is the result from the previous instruction, so the processor 10 may request that the memory-control circuitry 30 immediately fetch the results of the previous instruction. Such an operation is depicted in the top row of FIG. 3 at $t_2$. At the same time, as the second column of FIG. 3 indicates at $t_2$, the memory-control circuitry 30 is in the process of storing the error-correction code for "A" in the memory 32. If the system were arranged in the conventional manner so that storing of "A" had to await computation of the error-correction code for "A," it would not be possible to fetch "A" at $t_2$. Since storage and retrieval of a data word and its error-correction code are independent in the present invention, however, no delay in fetching "A" results from calculation of the error-correction code.

At $t_3$, FIG. 3 depicts in the first row the fetching of a second operand, "B," which is requested by the processor 10. The memory-control circuitry 30 therefore forwards it to the processor. Simultaneously, as the third row illustrates at $t_3$, the memory-control circuitry 30 finds a parity error in "A." At the same time, the processor receives "A" with its incorrect parity, as the fourth row indicates at $t_3$.

In response to the determination of incorrect parity, the memory-control circuitry 30 immediately enters a correction routine in which it calls up the error-correction code associated with "A" and rewrites the correct contents into the memory 32 if the error is correctable. The duration of this routine typically varies in accordance with the type of error that was detected. As is apparent from FIG. 1, the memory controller is subject to requests from sources other than the processor. Accordingly, the memory-control circuit 30 includes arbitration circuitry (not shown) for determining which device will obtain access to the memory control circuitry. According to the arbitration scheme, the error-correction routine has the highest priority, so access to the memory-control circuitry 30 is not permitted to any devices, including the processor, while the error-correction routine is running.

FIG. 3 shows no entry at $t_4$ in the bottom row, which represents processor activity. Of course, the processor is usually involved in activity of some sort, but FIG. 3 only illustrates those steps that are relevant to the present invention. Although the processor has received operand "A" with its parity bits, it does not react to the incorrect parity immediately. The reason for this is that, as was mentioned above, the processor is a pipeline machine and thus may obtain an operand some time before it actually needs to use it.

In FIG. 3, the time for actual use is depicted as occurring at $t_5$, at which time the processor 10 reacts to the incorrect parity by beginning an error routine during the subsequent cycle. This error routine typically lasts for considerably longer than the error-correction routine that the memory-control circuitry 30 executes; the processor's error routine typically involves a trap to a macroinstruction routine that performs error logging and other housekeeping functions that are not relevant to the present invention. By the time the processor's error routine is complete, the memory-control circuitry 30 has completed its correction routine and stored the corrected value of "A" in the appropriate location if the error was correctable. After storage of the corrected "A," which is depicted in the first row of FIG. 3 at a time arbitrarily designated $t_{50}$, the memory-control circuitry 30 is again ready to accept requests from other devices. This state is represented in the drawing by the legend "idle," although the memory-control circuitry 30 will only be idle if it receives no requests from the other devices.

The processor 10 eventually completes its error routine, as the bottom row in FIG. 3 indicates, by repeating its request that the memory-control circuitry 30 fetch the instruction in which the incorrect operand "A" occurred. Since the memory-control circuitry 30 immediately proceeded to correct location "A" when it detected the error, the correct value of "A" is immediately available when the instruction processor 10 requests operand "A," and the error-correction process does not itself cause any delay.

As was indicated above, the memory-control circuitry 30 typically completes its error correction before the processor 10 repeats its request for operand "A." Even if the processor 10 were to finish its error routine before completion of the memory-control circuitry's error-correction routine, the processor 10 would still receive good data. This is because the memory-control circuitry, as is mentioned above, gives highest priority to its own routine for correcting data; the processor 10, which must wait for arbitration before it is permitted access to the memory-control circuitry, simply is not awarded access until the error-correction routine is completed. When the error-correction routine is completed, of course, the contents have been corrected, and so the processor 10 receives correct data.

It is apparent from the foregoing description that it is possible, by following the teachings of the present invention, to provide the benefits of error correction while greatly reducing the delays that can result from the error-correction process. Not only are error-correction delays reduced, but so are delays that result from initial generation of the error-correction codes.

Those skilled in the art will recognize that the basic teachings shown in the preceding simple example can be applied to a wide range of data-processing arrangements. Aspects of the invention can be employed not only with cache memories but also with other memories and I/O devices. Thus, the present invention is an advance that has wide applicability to data processing systems generally.

We claim:

1. In a data processing system, the combination comprising:
    A. a memory circuit including a plurality of data locations for storing data, such as instructions and operands, and separate error-detection and error-correction codes associated with the data;
    B. processor means including:
        (i) means for generating memory-request signals that represent requests for the memory to send instructions and operands designated thereby;
        (ii) means for receiving the requested instructions and operands and the error-detection codes associated therewith and examining each received instruction and operand and the error-detection codes associated therewith to determine whether an error is present in that instruction or operand; and
        (iii) means for executing an instruction without applying it to error-correction circuitry if no error is detected in that instruction and any operand designated thereby and repeating the memory-request signal for that instruction if an error has been detected in that instruction or in an operand designated thereby; and
    C. memory control means connected to receive the memory-request signals from the processor means, the memory control means including:
        (i) means for operating the memory circuit to retrieve instructions and operands in response to the memory-request signals, and for operating the memory circuit to retrieve the error-correction code associated with an instruction or operand if an error is detected therein;
        (ii) means for examining the retrieved instructions and operands and their associated error-detection codes to determine whether errors exist therein;
        (iii) means for forwarding the instructions and operands and associated error-detection codes to the processor means without waiting for the determination of whether errors exist; and
        (iv) means for correcting any correctable detected error in accordance with that error-correction code, the data-processing system thereby providing for retrieval of correct instructions and operands without the delay required for error detection but still providing the capability for correction of errors in incorrect instructions and operands without correction by the processor means.

2. A combination as defined in claim 1 wherein:
    A. the memory circuit is organized to permit instructions and operands to be stored and retrieved separately from their associated error-correction codes;
    B. the processor means is connected to the memory control means to send data words to the memory control means for storage in the memory circuit;
    C. the memory control means is connected to receive the data words from the processor means and includes means for generating an associated error-correction code from each received data word;
    D. the means for operating the memory circuit operates the memory circuit to store the data word therein without waiting for generation of its associated error-correction code to be completed and subsequently stores the associated error-correction code, the data word thereby being ready for retrieval from the memory circuit before its associated error-correction code has been stored.

3. A combination as defined in claim 2 wherein the memory control circuit operates the memory circuit to retrieve the error-correction code associated with an instruction or operand only if an error is detected therein.

4. A combination as defined in claim 1 wherein the memory control circuit operates the memory circuit to retrieve the error-correction code associated with an instruction or operand only if an error is detected therein.

5. In a data processing system, the combination comprising:
    A. a memory circuit including a plurality of data locations for storing data, such as instructions and operands. and error-correction codes associated with the data, the memory circuit being organized to permit instructions and operands to be stored and retrieved separately from their associated error-correction codes;
    B. execution means for generating memory-request signals that represent requests for the memory to send instructions and operands designated thereby, for receiving the requested instructions and operands, and for executing instructions; and
    C. memory control means connected to receive the memory-request signals from the execution means and adapted to receive data words, the memory control means including:

(i) means for generating from a received data word an error-correction code associated therewith;

(ii) means for operating the memory circuit to store a received data word therein without waiting for generation of its associated error-correction code to be completed, subsequently operating the memory circuit to store the associated error-correction code, and further operating the memory circuit to retrieve instructions and operands in response to the memory-request signals; and (iii) means for forwarding those instructions and operands to the execution means, retrieval and forwarding of data for the execution means thereby being afforded without a delay resulting from generation of the associated error-correction codes.

6. A combination as defined in claim 5 wherein:

A. the memory circuit is operable for simultaneous retrieval of a data word and storage of its associated error-correction code; and B. the means for operating the memory circuit is operable to respond to memory-request signals by fetching a data word while it is simultaneously operating the memory circuit to store the associated error-correction code, fetching of data words thereby taking place without delaying storage of error-correction codes.

* * * * *